United States Patent [19]

Gattuso

[11] B 3,923,719

[45] Dec. 2, 1975

[54] RUBBER FORMULATIONS

[75] Inventor: Marion J. Gattuso, Hoffman Estates, Ill.

[73] Assignee: Universal Oil Products Company, Des Plaines, Ill.

[22] Filed: Sept. 24, 1973

[21] Appl. No.: 400,293

[44] Published under the Trial Voluntary Protest Program on January 28, 1975 as document no. B 400,293.

Related U.S. Application Data

[63] Continuation-in-part of Ser. No. 197,938, Nov. 11, 1971, abandoned.

[52] U.S. Cl......... 260/30.8 R; 260/33.6 A; 260/761
[51] Int. Cl.²............................................ C08K 5/36
[58] Field of Search....... 260/33.6 A, 33.6 AQ, 759, 260/761, 30.8 R

[56] References Cited

UNITED STATES PATENTS

| | | | |
|---|---|---|---|
| 2,989,513 | 6/1961 | Hendry et al. | 260/33.6 AS |
| 3,223,691 | 12/1965 | Greenberg et al. | 260/33.6 A X |
| 3,709,958 | 1/1973 | Burleigh | 260/759 |

OTHER PUBLICATIONS

Piccolastic; 1963; pages 6, 13, 18
Morton; Introduction to Rubber Technology; 1959; Reinhold Pub. Co.; pages 166–167.

*Primary Examiner*—Lewis T. Jacobs
*Attorney, Agent, or Firm*—James R. Hoatson, Jr.; Raymond H. Nelson; William H. Page, II

[57]. ABSTRACT

Rubber formulations contain, as an extender therein, the bottoms product of a styrene distillation column, said bottoms product containing as a major portion thereof an organo-sulfur compound.

6 Claims, No Drawings

RUBBER FORMULATIONS

CROSS-REFERENCE TO RELATED APPLICATIONS

This application is a continuation-in-part of my copending application Ser. No. 197,938 filed Nov. 11, 1971, now abandoned.

BACKGROUND OF THE INVENTION

The prior art has shown various rubber compositions containing components therein, said components adding to particular desirable characteristics of the rubber. For example, one prior art reference teaches that the bottoms from a catalytic cracking process may be used as a plasticizer in rubber, while another reference teaches that a poly(alkyleneimine) which possesses a molecular weight of at least about 250 and will contain an average of 5 imine groups per molecule may be utilized to retard the rate of vulcanization of highly extended compositions of certain liquid polymers. The plasticizer for the latter type of compound comprises a hydrocarbon oil, a halogenated hydrocarbon, bitumen, asphalt or coal tar. In addition to these prior art references, it has also been shown that a resinous polymeric styrene may be used as a plasticizer for rubber or rubber-like compositions. The resinous polymeric polystyrene is a valuable material which has to be prepared and distilled out of the polystyrene column, said styrene being polymerized in a manner hereinafter more fully discussed.

Present commercial operations comprise the dehydrogenation of ethylbenzene to styrene, followed by a distillation train to separate benzene-toluene as overhead from the first fractionation, ethylbenzene as overhead from the second fractionation and styrene as overhead from the final fractionation.

Because the styrene monomer undergoes polymerization when heated, the quality of the styrene degrades throughout the distillation recovery facilities. Accordingly, it is present practice to utilize polymerization inhibitors such as sulfur, t-butylcatechol, etc. In the final distillation step, to recover purified styrene as the overhead product, the bottoms product is composed of polystyrene, sulfur, organo-sulfur compounds, t-butylcatechol, undistilled styrene and cutback oil when used. The cutback oil generally is used to reduce the boiling temperature and the viscosity of the bottoms product and to facilitate handling thereof. Because further processing of the bottoms product is an expensive and difficult procedure, present practice generally is to burn the bottoms product or to dispose of it by other means. However, such burning or disposal of this product containing sulfur becomes a serious pollution problem.

DESCRIPTION OF THE INVENTION

It now has been found that the bottoms product may be used satisfactorily as an extender in rubber formulations. This use is surprising because, while the product contains a small amount of sulfur, it does not serve as a vulcanization or curing agent. Furthermore, because the bottoms product contains various ingredients, it is further surprising that the use thereof as an extender does not materially affect the properties of the cured rubber. In addition to the economical recovery of a heretofore waste product, the present invention avoids the pollution problem which is becoming increasingly more serious.

In one aspect an embodiment of this invention resides in a rubber formulation containing, as an oil extender therein, the bottoms product from a styrene distillation column, said bottoms product containing as a major portion thereof an organo-sulfur compound.

A specific embodiment of this invention is found in a synthetic rubber formulation containing, as an oil extender therein, the bottoms product from a styrene distillation column, said bottoms product containing as a major portion thereof an organo-sulfur compound containing from about 5 styrene molecules per sulfur atom.

Other objects and embodiments will be found in the following further detailed description of the present invention.

Present commercial practices in the manufacture of rubber products is to include an extender oil in the rubber formulation. This oil may be used in a concentration of from about 5 to 40 or more parts thereof per 100 parts of rubber. The extender oil serves various functions including plasticizer, softener, etc. and improves the processing of the rubber formulation. The extender oil generally is an aromatic oil and is selected to possess the desired properties and meets A.S.T.M. or other standard specifications. These requirements are specified in order that the extender oil will serve the desired purpose but will not adversely affect the properties of the cured rubber products. Accordingly, it is noted that any ingredients which are used in the rubber formulations also must possess the desired properties and also must not materially affect the properties of the final rubber products.

As hereinbefore set forth, the extender of the present invention comprises the bottoms product of a styrene distillation column. The crude styrene feed to the styrene column conventionally is the bottoms product from a preceding ethylbenzene column which, in turn, receives the bottom product from a benzene-toluene column, to which the effluent products from an ethylbenzene dehydrogenation system are supplied. The styrene column is of conventional design and contains suitable vapor-liquid contacting devices and preferably is maintained under vacuum in order to accomplish the desired distillation at the lowest practical temperature, thereby minimizing additional polymerization of the styrene. In general, these conditions include a temperature of from about 100° F. to about 250° F. and a subatmospheric pressure of from about 10 to about 20 mm. Hg. absolute. The specific operating conditions will be selected to produce an overhead product of high purity styrene, which may be above 95% and even above 99% by weight styrene. As hereinbefore set forth, sulfur, t-butylcatechol and/or other polymerization inhibitors are introduced into the distillation system and, as hereinbefore set forth, will be contained, at least in part, in the styrene tower bottoms. The distillation system described briefly herein is in extensive commercial use and accordingly need not be described in detail herein.

The column bottoms product from the styrene column is not simply polystyrene containing dissolved sulfur, but contains a major portion of complex organo-sulfur compounds. For example, polarographic analyses of the bottoms product will show that approximately 70% of the sulfur which is present in the product will comprise organo-sulfur compounds in which the sulfur and the syrene are present in a ratio of about 5 styrene molecules for every sulfur atom, the remainder of the product comprising minor portions of elemental sulfur along with minor amounts of polystyrene or styrene monomer.

As hereinbefore set forth, the bottoms product from a styrene column which consists mainly of complex organo-sulfur compounds is incorporated in conventional rubber formulations, preferably in a concentration of from about 0.5% to about 25% by weight of the rubber formulation. In some cases a higher concentration of the styrene column bottoms may be employed, say up to about 75% by weight of the rubber formulation. This higher concentration may be satisfactory for certain rubber products.

In addition to the styrene column bottoms consisting mainly of organo-sulfur compounds, rubber formulations conventionally include rubber hydrocarbon or other rubber precursor, carbon, zinc oxide, sulfur, stearic acid, antioxidant, antiozonant, etc., all of these being used in conventional concentrations. As a means of controlling the curing of the rubber stock, additional ingredients may also be included in the rubber formulation as, for example, thiuram disulfide, various sulfenamides, cyclohexylamine, N-cyclohexylthiophthalimide, mercaptobenzothiazole, etc. Also when desired, conventional extender oil may be included in the rubber formulation but generally the amount thereof preferably is decreased by the corresponding amount of styrene bottoms, although larger concentrations may be used. In any case these concentrations will be selected to obtain the desired improvements in the processing of the rubber formulation and to obtain the desired properties in the final rubber products.

As hereinbefore set forth the rubber formulation generally contains an antioxidant and/or antiozonant. Any suitable antioxidant or antiozonant may be used. Conventional antioxidants include one or more of 6-ethoxy-1,2-dihydro-2,2,4-trimethylquinoline, butylated hydroxytoluene, phenyl-beta-naphthylamine, diphenylamine-acetone reaction products, etc. Conventional antiozonants include one or more of N,N'-di-sec-alkyl-p-phenylenediamines in which each alkyl contains from 3 to 8 carbon atoms, N-phenyl-N'-sec-alkyl-p-phenylenediamines in which the alkyl contains from 3 to 8 carbon atoms, N,N'-diphenyl-p-phenylenediamine, N-phenyl-N'-cyclohexyl-p-phenylenediamine, N,N'-dicyclohexyl-p-phenylenediamine, etc. The antioxidant and/or antiozonant are used in conventional concentrations which, for the antioxidant generally is from about 0.5% to about 1.5% and for the antiozonant is from about 2% to about 5% by weight, although higher or lower concentrations may be used as desired.

The novel method of the present invention is used in any suitable rubber formulation. The rubber may be synthetic or natural. Synthetic rubbers include SBR (styrene-butadiene), butyl rubber (butadiene-isoprene), butadiene-acrylonitrile, polyisoprene, polybutadiene, terpolymers, etc. Natural rubbers include Hevea rubber, Caoutchouc, Balata, Gutta-Percha, etc. The rubbers generally are polymers of conjugated 1,3-dienes, either as polymers thereof or as copolymers thereof with other polymerizable compounds, and are so referred to in the present specifications and claims.

The styrene column bottoms containing the complex organo-sulfur compounds of the type hereinbefore set forth are incorporated in the rubber formulation in any suitable manner. In general, this is accomplished in substantially the same manner as the present method of incorporating extender oil. The rubber formulation then is subjected to curing or vulcanization in conventional manner.

The following examples are introduced to illustrate further the novelty and utility of the present invention but not with the intention of unduly limiting the same.

EXAMPLE I

The rubber formulation used in this example was of the following recipe.

Table I

| Ingredient | Parts by Weight |
|---|---|
| SBR 1502 | 100 |
| Carbon | 40 |
| Extender Oil | 10 |
| Zinc Oxide | 3 |
| Stearic Acid | 2 |
| Antiozonant | 2 |
| Sulfur | 2 |
| Accelerator | 1.25 |
| Styrene Column Bottoms | as indicated |

The extender oil is commercially available as "Sundex 790" The antiozonant is N,N'-di-2-octyl-p-phenylenediamine. The accelerator is N-tert-butylbenzothiazole-2-sulfenamide. The rubber formulation was cured for 40 minutes at 140° C.

The rubber samples were evaluated in a Monsanto Oscillating-Disk Rheometer (at 300° F.) to determine the curing properties. The physical properties were obtained in conventional manner and include Shore A hardness, ultimate elongation, 200% modulus, 300% modulus and tensile strength.

For comparative purposes, the run conducted without the styrene column bottoms but otherwise being of the same recipe is reported in the following table. This is a control run and is utilized as a standard for comparison with the other runs. In other words, the objective is to determine that the runs made with the styrene column bottoms result in a final product without material deviations from the standard.

The styrene column bottoms used in this example were obtained commercially in substantially the same manner as described hereinbefore. Polarographic analysis indicated that the product had about 7% by weight of total sulfur of which 2.1 wt. % represented the amount of elemental or dissolved sulfur present. The analysis further indicated that approximately 70% of the sulfur present was bound up as organo-sulfur compounds which possess a ratio of about 5 styrene molecules for every sulfur atom present, and about 4% of styrene monomer. Other styrene column bottoms may contain from 5% to 10%, more or less, of sulfur, and/or 0 to about 10% of styrene monomer. The results of these runs are reported in the following table.

TABLE II

| Run No. | Styrene Column Bottoms Parts by Weight | $T_2$ | $M_L$ | $M_H$ | k | CRI | Shore A Hardness | Ultimate Elongation % | Modulus 200% psi | Modulus 300% psi | Tensile Strength psi |
|---|---|---|---|---|---|---|---|---|---|---|---|
| 1 | none | 5.1 | 21.3 | 69.9 | 0.192 | 12.76 | 57.0 | 410 | 820 | 1290 | 1835 |
| 2 | 1 | 4.9 | 20.9 | 68.3 | 0.231 | 12.37 | 57.0 | 335 | 705 | 1185 | 1395 |

TABLE II-continued

| Run No. | Styrene Column Bottoms Parts by Weight | $T_2$ | Rheometer Data $M_L$ | $M_H$ | k | CRI | Shore A Hardness | Ultimate Elongation % | Modulus 200% psi | 300% psi | Tensile Strength psi |
|---|---|---|---|---|---|---|---|---|---|---|---|
| 3 | 5 | 4.9 | 19.1 | 66.1 | 0.228 | 11.54 | 57.5 | 335 | 725 | 1240 | 1445 |
| 4 | 10 | 5.1 | 17.2 | 63.8 | 0.213 | 10.50 | 56.5 | 370 | 745 | 1215 | 1585 |
| 5 | 25 | 5.1 | 13.7 | 56.8 | 0.192 | 8.85 | 55.0 | 335 | 690 | 1125 | 1305 |
| 6 | 5 (no sulfur) | 16.0 | 17.0 | 22.0 | no cure | | 40.0 | 1000+ | 0 | 25 | 25 |

In the above table, $T_2$ is the time to 2 point rise in torque value. $M_L$ is the minimum torque. $M_H$ is the maximum torque. k is the first order rate constant of cross-linking reaction. The CRI value is the ASTM cure-rate index.

Referring to the data in the above table, it will be noted that the rubber formulations containing the styrene column bottoms which contained the complex organo-sulfur compounds produced satisfactory cured products. While the properties of the samples containing the styrene column bottoms differ somewhat from the control run (Run No. 1), in general these differences are not material and the final rubber products are satisfactory for practically all uses. In fact, as hereinbefore set forth, even higher concentrations of styrene column bottoms may be employed to prepare rubber products which will be satisfactory for some applications.

EXAMPLE II

Included in Table II above is Run No. 6 which was made with the same recipe as hereinbefore set forth except that no sulfur was used. Because the styrene column bottoms contained approximately 7% by weight of sulfur, it normally would be expected that this product would serve as a curing or vulcanization agent. However, as shown by the data in the table, no cure was effected in Run No. 6. This demonstrates the unusual result obtained when utilizing the styrene column bottoms which contained a major portion of complex organo-sulfur compounds as an extender.

EXAMPLE III

In this example, styrene column bottoms of the type set forth in Example I above are incorporated in natural rubber. The rubber is the following recipe.

Table III

| Ingredient | Parts by Weight |
|---|---|
| Smoked Sheet | 100 |
| HAF - Black | 45 |
| Styrene Column Bottoms | 15 |
| Zinc Oxide | 3 |
| Stearic Acid | 3 |
| Sulfur | 2.5 |
| Antioxidant | 1.0 |
| Accelerator | 0.75 |

The accelerator is N-cyclohexyl-2-benzothiazole-sulfenamide. The antioxidant is butylated hydroxytoluene. The rubber formulation is cured for 40 minutes at 140° C.

EXAMPLE IV

In this example, 10% by weight of styrene column bottoms similar in nature to those described in Example I above is incorporated in a natural rubber white stock formulation. The rubber formulation is as follows.

Table IV

| Ingredient | Parts by Weight |
|---|---|
| Pale crepe | 100 |
| Titanium dioxide | 25 |
| Styrene column bottoms | 24 |
| Zinc Oxide | 7.5 |
| Stearic Acid | 3 |
| Sulfur | 3 |
| Benzothiazole disulfide | 1 |
| Ethoxy-1,2-dihydro-2,2,4-trimethylquinoline | 6 |

The rubber is cured for 40 minutes at 280° C.

I claim as my invention:

1. A rubber formulation containing, as an oil extender therein, a styrene distillation column bottoms product obtained by distillation of styrene in the presence of a sulfur polymerization inhibitor, said bottoms product containing as a major portion thereof an organo-sulfur compound.

2. The rubber formulation as set forth in claim 1 in which said organo-sulfur compound contains about 5 styrene molecules per sulfur atom.

3. The rubber formulation as set forth in claim 1 in which said extender is present in an amount of from about 0.5% to about 25% by weight of the said formulation.

4. The rubber formulation as set forth in claim 1 being a synthetic rubber formulation.

5. The rubber formulation as set forth in claim 1 being natural rubber.

6. The rubber formulation as set forth in claim 1 being a styrene-butadiene formulation.

* * * * *